(12) United States Patent
Hosier et al.

(10) Patent No.: US 7,446,907 B2
(45) Date of Patent: Nov. 4, 2008

(54) PHOTOSENSOR ARCHITECTURE FOR A COLOR RASTER INPUT SCANNER

(75) Inventors: Paul A. Hosier, Rochester, NY (US); Jagdish C. Tandon, Fairport, NY (US); Scott L. TeWinkle, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1058 days.

(21) Appl. No.: 10/420,989

(22) Filed: Apr. 22, 2003

(65) Prior Publication Data

US 2004/0212858 A1 Oct. 28, 2004

(51) Int. Cl.
*H04N 1/04* (2006.01)

(52) U.S. Cl. .................. 358/474; 358/482; 358/512; 348/313; 348/303

(58) Field of Classification Search .......... 358/482, 358/483, 474, 512, 513, 514, 515, 408; 348/313, 348/280, 303; 250/208.1
See application file for complete search history.

(56) References Cited

U.S. PATENT DOCUMENTS

| 3,760,381 | A | * | 9/1973 | Yao .................. 365/205 |
| 4,547,074 | A | * | 10/1985 | Hinoda et al. .......... 356/405 |
| 4,686,574 | A | * | 8/1987 | Erhardt .................. 348/324 |
| 4,845,567 | A | * | 7/1989 | Yamaguchi et al. ........ 358/482 |
| 4,870,483 | A | * | 9/1989 | Nishigaki et al. ........ 358/512 |
| 4,896,216 | A |   | 1/1990 | Brunst et al. .......... 358/213.29 |
| 5,105,277 | A |   | 4/1992 | Hayes et al. .......... 358/213.31 |
| 5,119,181 | A | * | 6/1992 | Perregaux et al. ........ 348/275 |
| 5,424,855 | A | * | 6/1995 | Nakamura et al. ........ 358/472 |
| 5,543,838 | A |   | 8/1996 | Hosier et al. .......... 348/311 |
| 5,691,760 | A | * | 11/1997 | Hosier et al. .......... 347/238 |
| 6,137,100 | A |   | 10/2000 | Fossum et al. ........ 250/208.1 |
| 6,141,045 | A | * | 10/2000 | Tewinkle et al. ........ 348/246 |
| 6,184,929 | B1 |   | 2/2001 | Noda et al. .......... 348/315 |
| 6,266,438 | B1 | * | 7/2001 | Metcalfe et al. ........ 382/162 |
| 6,625,305 | B1 | * | 9/2003 | Keren .................. 382/162 |
| 6,654,058 | B1 | * | 11/2003 | Hosier et al. .......... 348/301 |
| 6,657,662 | B1 | * | 12/2003 | Hosier et al. .......... 348/245 |
| 7,170,651 | B2 | * | 1/2007 | Okamura ............... 358/474 |
| 2002/0101522 | A1 | * | 8/2002 | Hosier et al. .......... 348/241 |
| 2003/0210435 | A1 | * | 11/2003 | Tsunai ................. 358/483 |

FOREIGN PATENT DOCUMENTS

EP 0 541 332 A1 5/1993

OTHER PUBLICATIONS

Hosier et al., U.S. Appl. No. 10/421,010, titled "Readout System for a CMOS-Based Image Sensor Array", filed simultaneously herewith.

* cited by examiner

*Primary Examiner*—Edward L. Coles
*Assistant Examiner*—Negussie Worku
(74) *Attorney, Agent, or Firm*—R. Hutter

(57) ABSTRACT

In an image sensor array, as would be used in an input scanner such as in a digital copier, an original image is moved relative to a linear array of photosites. Each photosite includes at least two wide photosensors, each of which extends substantially across the photosite along the array direction, and at least two narrow photosensors, which are arranged next to each other along the array direction. In one embodiment, the wide photosensors include primary-color filters and the narrow photosensors are clear-filtered.

18 Claims, 3 Drawing Sheets

PHOTOSENSOR ARCHITECTURE FOR A COLOR RASTER INPUT SCANNER

CROSS-REFERENCE TO RELATED APPLICATION

Cross-reference is hereby made to U.S. patent application Ser. No. 10/421,010; titled READOUT SYSTEM FOR A CMOS-BASED IMAGE SENSOR ARRAY, assigned to the assignee hereof, being filed simultaneously herewith; now US Publication No. 20040212850, published Oct. 28, 2004.

TECHNICAL FIELD

The present disclosure relates to a full-color raster input scanner, or image sensor array, useful in recording hard-copy images as digital signals, as would be found, for example, in a digital copier.

BACKGROUND

Raster input scanners typically comprise one or more linear arrays of photosensors which raster scan an image bearing document and convert the microscopic image areas viewed by each photosensor to image signal charges. Following an integration period, the image signal charges are amplified and transferred as an analog video signal to a common output line or bus through successively actuated multiplexing transistors. In a full-color raster input scanner, there are typically provided three linear arrays, each array has associated therewith a translucent primary-color (such as RGB) filter; the signals from each primary-color-filtered array can subsequently be combined as color separations of a full-color image. For high-performance image sensor arrays, a preferred design includes arrays of photosensors of a width comparable to the width of a page being scanned, to permit one-to-one imaging generally without the use of reductive optics. In one known design, an array is intended to be made of 20 silicon chips, butted end-to-end, each chip having 248 active photosensors, spaced at 400 photosensors per inch, per linear array.

In the context of a digital copier, optical conditions relating to the original input scanning of the original can result in print quality shortcomings and artifacts in, for example, a color copy made from the originally-scanned image data. Many of these possibly-detrimental optical conditions are closely related to the basic photosensor architecture, or photosensor configuration, of the raster input scanner. Since the human eye cannot detect high spatial frequency changes in chroma (color), but can detect high frequency changes in luminance (dark to light), it may be desirable to have photosensors that have higher resolution luminance detection and lower resolution chroma detection. This is especially true if one is trying to minimize the data bandwidth for a given level of human visual image quality. Another consideration is having signals from all detecting photosensitive regions that are about the same level so that the signal to noise ratio (SNR) is comparable for all color separation signals.

In addition, the translucent filter layers placed on some or all of the photosensitive regions of a photosensor array will change the signal level for a given light of an original color. It is also not desirable to sub-sample color as in Bayer's pattern, because of aliasing or Moire effects. All of the above goals conflict to some extent, if commonly used methods are used for the layout and readout of the multi-resolution device.

PRIOR ART

U.S. Pat. Nos. 5,119,181; 6,137,100; and 6,184,929 disclose a number of possible geometries which can be used for differently-filtered photosites in a full-color photosensor array.

U.S. Pat. No. 5,105,277 discloses a sensor array in which performance variations among different photosites in the array are canceled out by the injection of a "fat zero" bias via the middle node between first and second stage transfer transistors for transferring the image signal charge from the photodiode to an amplifier. The main purpose of the fat zero bias voltage is to ensure transfer efficiency of collected charge on the photodiode, and thereby give a linear response to all levels of light detected by the photodiode.

U.S. Pat. No. 5,543,838 discloses a CMOS-photodiode-based imaging apparatus capable of recording full-color images. Three photodiodes, each associated with a two-stage bucket-brigade transfer device, and each associated with a filter for a primary color, send signals to common node.

SUMMARY OF THE INVENTION

According to one aspect of the present invention, there is provided an image sensor array, comprising a linear array of photosites, the linear array extending along an array direction. Each photosite includes at least two wide photosensors and at least two narrow photosensors, each wide photosensor extending substantially across a width of the photosite along the array direction. The narrow photosensors are arranged within the photosensor site along the array direction.

According to another aspect of the present invention, there is provided an image sensor array, comprising a plurality of photosites for receiving light, each photosite having associated therewith: at least two photosensors of a first type; a bucket-brigade transfer circuit associated with each photosensor of the first type; at least two photosensors of a second type; a switch associated with each photosensor of the second type; an intermediate node for receiving signals from the switches; a bucket-brigade transfer circuit associated with the intermediate node; and a common node for receiving signals from the bucket-brigade transfer circuits.

DETAILED DESCRIPTION

Figure 1:
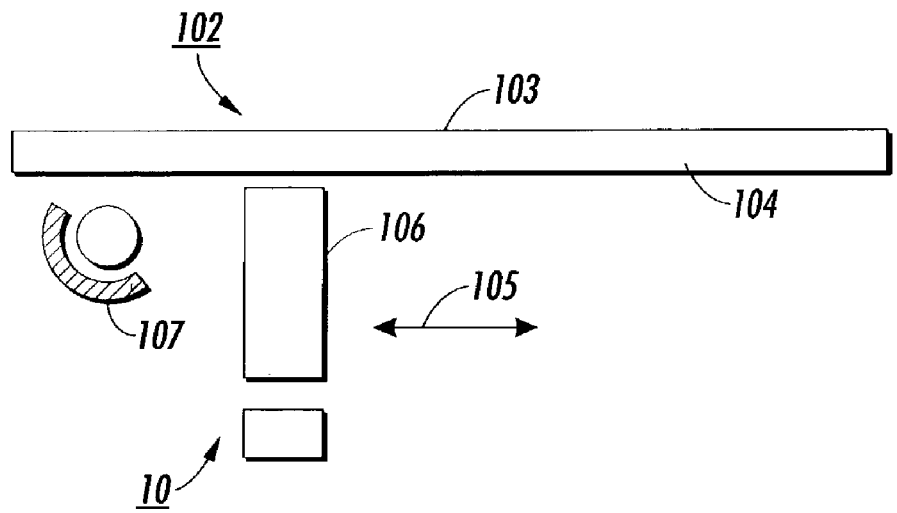
FIG. 1 is an elevational view of the elements of an exemplary raster input scanner.

Referring to FIG. 1, there is shown the elements of an exemplary raster input scanner, designated generally by the numeral 102, of the type adapted to use a scanning array, or sensor bar 10. Sensor bar 10 comprises a linear full width array having a scan width in the fast scan direction substantially equal to or slightly greater than the width of the largest document 103 or other object to be scanned. Documents to be scanned are supported on a generally rectangular transparent platen 104, typically glass, sized to accommodate the largest original document 103 to be scanned. A document 103 to be scanned is located either manually or by a suitable automatic document handler or feeder (not shown) on platen 104 for scanning. Array 10 is supported for reciprocating scanning movement in the scan direction depicted by arrows 105 below platen 104 by a movable scanning carriage (not shown). A lens 106 focuses array 10 on a line like area extending across the width of platen 104. One or more lamp and reflector assemblies 107 are provided for illuminating the line-like area on which array 10 is focused.

Figure 2:
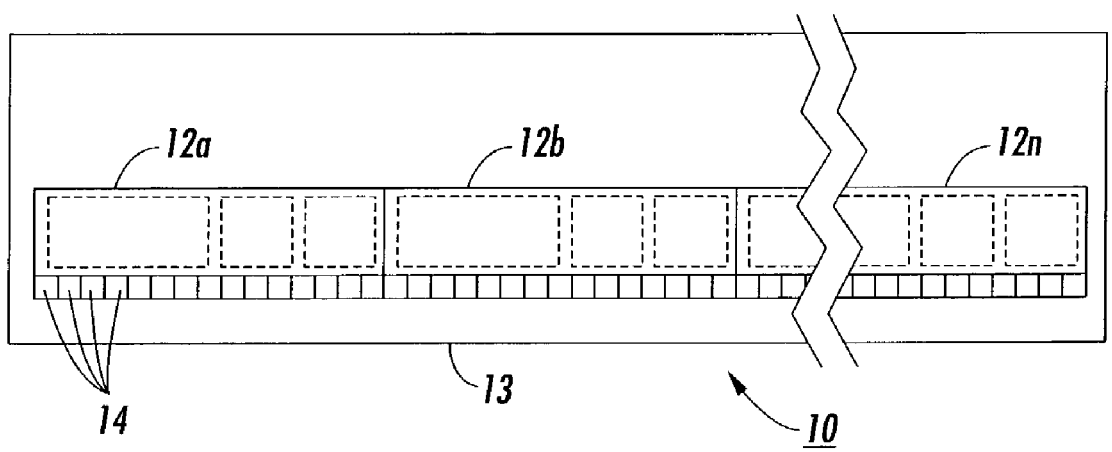
FIG. 2 is a plan view of a sensor bar as would be used with a raster input scanner.

Referring to FIG. 2, there is shown a long or full width sensor bar 10 composed of a plurality of smaller sensor chips 12 assembled together end-to-end (specific chips are identified by numerals 12a, 12b, . . . 12n) on an elongated generally rectangular rigid substrate 13.

Chips 12, which may, for example, be charge coupled devices (CCDs) or MOS sensor arrays, are relatively thin silicon dies having a generally rectangular shape. A row 16 of photosites 14 parallel the longitudinal axis of the chips. While a single row 16 of photosites 14 is shown, plural photosite area rows may be contemplated. Other active elements such as shift registers, gates, pixel clock, etc., are preferably formed integrally with chips 12. Suitable connectors (not shown) are provided for electrically coupling the chips 12 to related external circuitry.

Sensor bar 10 may for example be used to raster scan a document original, and in that application, the document original and the sensor array 10 are moved or stepped relative to one another in the slow scan direction perpendicular to the linear axis of array 10. At the same time, the array scans the document original line by line in the fast scan direction parallel to the linear axis of the array. The image line being scanned is illuminated and light from the document is focused onto the photosensors in what is here called a photosite 14: each photosite 14 may include a plurality of photosensors, as will be described below. During an integration period, a charge is developed on each photosensor proportional to the reflectance of the image area viewed by each photosensor. The image signal charges are thereafter transferred to an output bus in a timed sequence, as generally known in the prior art.

Figure 3:
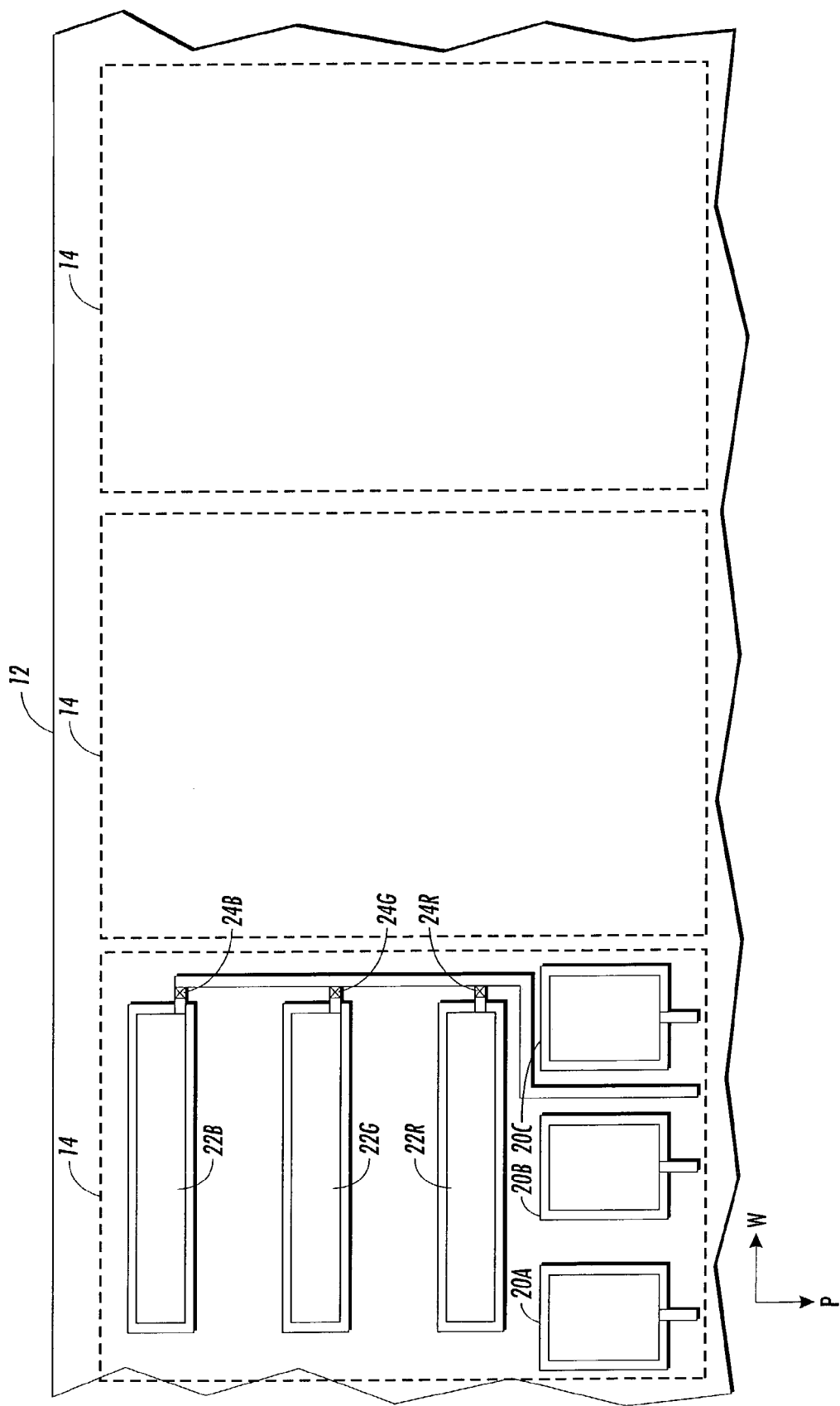
FIG. 3 is a plan view showing a sample of photosensor areas as would exist on a chip.

FIG. 3 is a plan view showing a sample of photosite 14 as would exist on a chip 12. In the embodiment, each photosite 14 includes six distinct, and substantially independently operable, photosensors: three "narrow" photosensors, indicated as 20A, 20B, 20C; and three "wide" photosensors, indicated as 22R, 22G, and 22B. The three narrow photosensors 20A, 20B, 20C are narrow in width along the width dimension W along which they, and other narrow photosensors in other photosensor sites, form a linear array, which extends across the entire chip 12 and, in some embodiments, across an entire multi-chip sensor bar. The three wide photosensors 22R, 22G, 22B are wider along the W (array) dimension, with each wide photosensor corresponding generally to three narrow photosensors; they are disposed within each photosite 14 along a process direction P along which a sheet having a image to be recorded (as in FIG. 1) moves relative to the sensor bar.

In this embodiment, each of the narrow photosensors 20A, 20B, 20C is substantially "unfiltered" or "clear" with regard to the visible light spectrum. Each of the "wide" photosensors 22R, 22G, 22B is provided with a primary-color filter (not shown) such as one for red (22R) green (22G) and blue (22B). The application of translucent filters over specific photosensors or sets of photosensors in an image sensor array is generally known in the art. The result of using such primary-color filters is that the image-based signals produced by each primary-color-filtered photosensor correspond to useable color separations which can subsequently be used to assemble a full-color image.

It can thus be seen that each photosite 14 provides a high-spatial resolution "clear" or "luminance" output through its three narrow photosensors 20A, 20B, 20C, as well as a relatively lower spatial-resolution color-separation or "chroma" output through the wide photosensors 22R, 22G, 22B. So, if the apparatus is used in a black and white scanning application, only the clear row of narrow photosensors 20A, 20B, 20C is read out and the apparatus provides excellent high resolution quality. If the apparatus is used in color scanning, with all the photosensors in each photosite 14, excellent high-resolution color can be obtained, by carefully processing the relatively low-resolution chroma information from the wide photosensors 22R, 22G, 22B and the high resolution luminance information from the high-resolution narrow photosensors 20A, 20B, 20C. The chroma information can be used to derive the correct luminance information from the clear photosensitive output.

One practical advantage of having the high resolution narrow photosensors 20A, 20B, 20C clearly filtered, instead of in green as known in the prior art, is that four times the level of signal can be obtained in a scanner with white light. If an apparatus is operating at relatively low signal levels (as would be the case with 1200 SPI scanning) where dark signal dominates in our sensors, this translates into a four times higher signal-to-noise ratio. Also, the narrow photosensors 20A, 20B, 20C are less sensitive to magenta half-tone screening Moire' effects that might occur with a green-filtered high resolution row.

An aspect of this implementation is making the layout and integration time of each type of photosensitive region such that the same level of signal is obtained for all photosensors in the photosite 14. In the case of a 1200/400 SPI C/M (color/mono) sensor of the design shown in FIG. 3, the luminance/chroma resolution ratio is 3. Therefore, if the wide photosensors 22R, 22G, 22B were full size regions (400 SPI, 63.5 um×63.5 um), they would have approximately nine times as much response as the narrow photosensors 20A, 20B, 20C (1200 SPI, 21.17 um×21.17 um). If the color photosensors are read out at a 400 SPI timing interval, this makes the integration for chroma three times as large as it is for the luminance detectors, which would make the response of the chroma pixels 27 times more than the luminance pixels. However, the color filters over the wide photosensors 22R, 22G, 22B attenuate the signal by about a factor of four in comparison to the clear regions. To get the signals to match, the dimensions of the wide photosensors 22R, 22G, 22B would need to be reduced by a factor of 4/27. The best way to do this to minimize chip area and aliasing (pixel opening beating with periodic pattern on document, such as half tone dots) is to make the photosensor shorter along dimension P. During constant velocity scanning the color pixels will still sweep over the entire 400 SPI distance in the slow scan direction, so that no aliasing along dimension P will occur.

Figure 4:
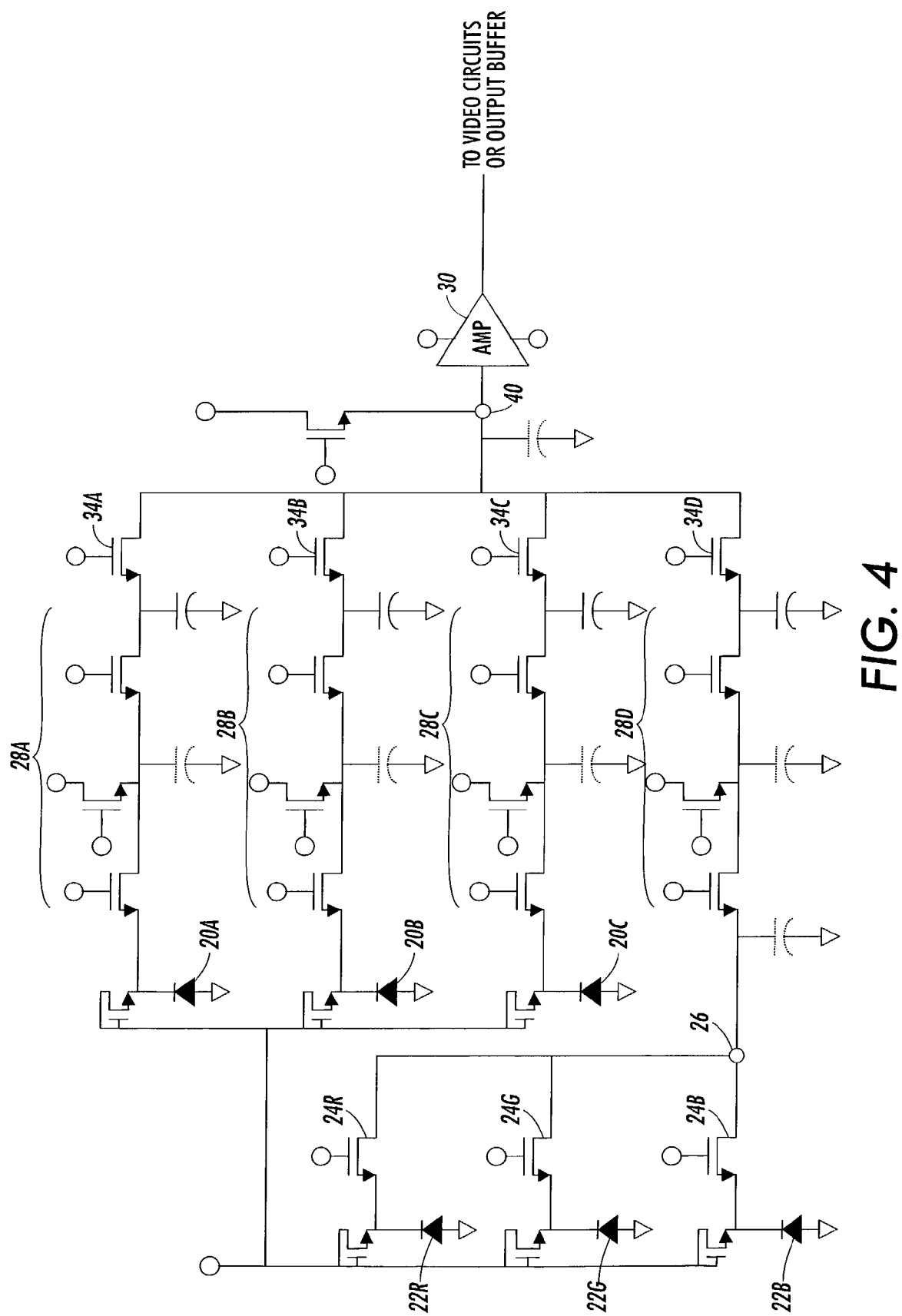
FIG. 4 is a schematic diagram of circuitry associated with a plurality of photosensors forming a photosensor area.

FIG. 4 is a schematic diagram of one embodiment of circuitry which can be used with the photosensor layout of FIG. 3, in particular using CMOS technology wherein each photosensor shown in FIG. 3 is in the form of a photodiode as shown in the schematic of FIG. 4. For each photosite 14, the three wide photosensors 22R, 22G, 22B, shown as photodiodes in FIG. 4, are each associated with an adjacent switch device, here indicated as 24R, 24G, 24B. Each switch device in this embodiment is a MOS device which operates in a linear region for drift current operation, in effect operating merely as a digital switch so that the level of voltage on the photodiode 22R, 22G, 22B is not determined or limited by the device 24R, 24G, 24B. Since each switch device is not a "bucket brigade" transfer device, for which the drain conductance and gate length is important, the switch device can made very small, which is advantageous from the standpoints of space, thermal noise, and parasitic capacitance. Also, returning for a moment to FIG. 3, the switch devices 24R, 24G, 24B, because of the above-mentioned properties, can be placed physically close to their respective photosensors. The light-related outputs of each wide photosensor are sequentially switched (by a control system, not shown) to a common node 26, which has a predetermined capacitance associated therewith.

The narrow photosensors 20A, 20B, 20C in each photosite 14 are each associated with a two-stage, fat-zero transfer circuit 28A, 28B, 28C. Such a transfer circuit and its operation is described in detail in the '277 patent referenced above. In each transfer circuit are two MOS devices, between which is a "fat zero" node, upon which a fat zero charge can be supplied via an external source (not shown). Downstream of each transfer circuit, before amplifier 30 which reads out voltage signals to a video out line, is a reset node 32 which accepts an external reset signal. The basic purpose of the fat zero injection is to "prime the pump" of charge transfer through each transfer circuit, so that the associated photodiode outputs signal charges in its linear range of response relative to light impinging thereon. Together, the two devices in series within each transfer circuit operate in a "fill and spill" or "bucket brigade" fashion, transferring out a carefully-maintained charge through two steps, so that the resulting voltage output from amplifier 30 is an accurate signal related to the light impinging on the associated photosensor during a defined integration period.

In this embodiment, the devices in series within each transfer circuit operate in a subthreshold region for diffusion current operation to enable the "bucket brigade" or "fill and spill" transfer as described in the '277 patent. This is in contrast to the switch devices 24R, 24G, 24B described above, which operate in a linear region for drift current operation.

The intermediate node 26 connecting the outputs of the three wide, or color, photosensors 22R, 22G, 22B is in connected to another two-stage transfer circuit 28D, which in this embodiment is substantially identical to the other transfer circuits 28A, 28B, 28C which are connected to the narrow photosensors 20A, 20B, 20C. By this architecture, the outputs of the wide photosensors 22R, 22G, 22B can be sent, by controlling the associated switch devices 24R, 24G, 24B, in any order or at any time, depending on a desired readout routine, to transfer circuit 28D, the operation of which can be coordinated as desired with the outputs of narrow photosensors 20A, 20B, 20C, to cause a series of outputs in a predetermined order to amplifier 30 onto a video line. If it is desired not to have color readout from the apparatus, transfer circuit 28D is simply not used in the readout. The control of the switch devices 24R, 24G, 24B and transfer circuits 28A, 28B, 28C, 28D is carried out over a large number of photosites 14 by a control system (not shown), which may be controlled by a microprocessor, in a manner generally familiar in the art.

The two stage bucket brigade transfer devices 28A-D, for color and mono, transfer charge to an intermediate storage node indicated as 40, ultimately for transfer to a video-out line through amplifier 30. Since charge from all the mono photodiodes 20A-C are transferred at the same time through their respective transfer devices 28A-C, the scanned region for each mono photosensor 20A-C is aligned perfectly with the next, even though the different mono photodiodes' signal will be read out at a different time through the pixel amplifier 30. The spacing of the color rows (photosensors 22R, 22B, 22C) to the mono row (photosensors 20A, 20B, 20C) is such that these rows are also aligned together. The devices 34A-D are used to read out any one of the mono or color signals stored on the storage capacitor, at the appropriate time. For instance, if device 34A is activated, in the linear region as a switch, the charges from all mono photosensors 20A on a chip are transferred to the input of one or more amplifiers 30. The amplifiers 30 are successively read out and then the next mono or color pixel charge is transferred to the reset node of the amplifier and read out in the same manner, and so on. Since the 34A-D devices act in the linear region and not in bucket brigade transfer, this implementation is different than the implementation of U.S. Pat. No. 5,543,838.

In a practical implementation, an important consideration is the spacing of the rows of photosensors along process direction P, the narrow photosensors 20A, 20B, 20C of various photosites 14 forming one row, the wide photosensors 22R, 22G, 22B forming their own rows among the photosites 14. It is desirable to have each color-photosensor row be centered an integer number of high resolution scan line pitches away from the center of the high resolution mono row (i.e., the narrow photosensors in the FIG. 3 embodiment). In addition, in color mode, when the mono row is not read out, it is desirable that each row be centered X+1/N low resolution rows apart, where X is any integer and N is the number of colors read out. The above two requirements imply that the ratio of low resolution pitch to high resolution pitch must be equal to the number of color rows, to operate the sensor in both color and color/mono combination mode. The layout of FIG. 3 meets this requirement. Another possibility is to have two color rows (red and blue, for example) and a green filter, defining multiple photosensors for each photosite, for the high resolution luminance row.

One other consideration to minimize dark nonuniformity between photosensitive regions, with this type of transfer scheme, is to make the effective capacitance of all the photosensitive regions in a photosite 14 equal. In the illustrated embodiment, the photo-collecting regions are diodes, and the photosensitive region is the entire opening in a photosite-defining metal layer around each photosite 14. Therefore, the diode area does not necessarily have to be the same size as the photosensitive region, but should be made to match, in capacitance, the other diodes.

The invention claimed is:

1. An image sensor array, comprising:
   a linear array of photosites, the linear array extending along an array direction,
   each photosite including at least two wide photosensors and at least two narrow photosensors, each wide photosensor extending substantially across a width of the photosite site along the array direction, the narrow photosensors being arranged within the photosite along the array direction;
   each of the wide photosensors having a switch associated therewith, the switch of each wide photosensor being disposed proximate to the wide photosensor, each of the wide photosensors in a photosite being associated with a common transfer circuit; and
   each of the narrow photosensors being associated with a transfer circuit.

2. The image sensor array of claim 1, each of at least two of the wide photosensors being sensitive to a predetermined color.

3. The image sensor array of claim 1, each of at least two of the wide photosensors having associated therewith a translucent filter.

4. The image sensor array of claim 1, wherein there are three wide photosensors, each wide photosensor being sensitive to a predetermined primary color of the visible spectrum.

5. The image sensor array of claim 4, each of the narrow photosensors being substantially clear with regard to the visible spectrum.

6. The image sensor array of claim 1, each of the wide photosensors including a photodiode.

7. The image sensor array of claim 1, the switch associated with each wide photosensor comprising a semiconductor device operating in a linear region.

8. The image sensor array of claim 1, the transfer circuit associated with each narrow photosensor including means for accepting a fat zero charge.

9. The image sensor array of claim 1, each of the wide photosensors having a switch associated therewith.

10. The image sensor array of claim 1, the common transfer circuit including means for accepting a fat zero charge.

11. The image sensor array of claim 9, the switch comprising a semiconductor device operating in a linear region.

12. The image sensor array of claim 9, wherein a capacitance associated with each wide photosensor is substantially equal to a capacitance associated with each narrow photosensor.

13. An image sensor array, comprising a plurality of photosites for receiving light, each photosite having associated therewith:
  at least two photosensors of a first type;
  a bucket-brigade transfer circuit associated with each photosensor of the first type;
  at least two photosensors of a second type;
  a switch associated with each photosensor of the second type;
  an intermediate node for receiving signals from the switches;
  a bucket-brigade transfer circuit associated with the intermediate node; and
  a common node for receiving signals from the bucket-brigade transfer circuits.

14. The image sensor array of claim 13, each switch comprising a semiconductor device operating in a linear region.

15. The image sensor array of claim 13, further comprising a switch interposed between each bucket-brigade transfer circuit and the common node.

16. The image sensor array of claim 13, wherein at least one of the photosensors of the second type is associated with a primary-color filter.

17. The image sensor array of claim 13, wherein each photosensor of the second type is associated with a primary-color filter, and each photosensor of the first type is effectively unfiltered.

18. The image sensor array of claim 13, wherein each photosensor of the second type is relatively wide with respect to an array direction, and each photosensor of the first type is relatively narrow with respect to the array direction.

* * * * *